3,703,499
FUSIBLE THERMOSETTING POWDER RESIN AND
PRODUCTION THEREOF
Martin K. Lindemann, 102 Independence Drive,
Greenville, S.C. 29607
No Drawing. Filed Jan. 28, 1971, Ser. No. 110,768
Int. Cl. C08g 22/20
U.S. Cl. 260—77.5 AT     13 Claims

ABSTRACT OF THE DISCLOSURE

Thermoplastic resin powder containing active hydrogen is mulled with a stoichiometric deficiency of liquid alkoxy monoisocyanate. This consumes the active hydrogen atoms at the surface of the powder, generating alkoxy groups at the surface surrounding a core containing unreacted active hydrogen atoms. When the powder is fused, the active hydrogen atoms remaining in the core mix with the alkoxy groups generated at the surface to induce a rapid thermosetting action after significant fusion has been completed.

---

The present invention relates to fusible resins possessing thermosetting characteristics and which are in powder form.

Powder resins are particularly useful for molding and coating with the powder particles fusing together under the influence of elevated temperature, either with or without the assistance of pressure. Most of these powder resins have been thermoplastic, but this limits the utility of the product since the thermoplastic materials are heat and solvent sensitive and the physical properties are frequently inadequate. On the other hand, the thermoplastic resins flow and fuse easily and are frequently quite attractive and available with economic advantage.

The main objective of this invention is to provide a simple and effective means of transforming certain types of thermoplastic resin powders into thermosetting resin powders and to provide thermosetting resin powders which maintain their capacity to fuse and flow.

It will be appreciated that it is difficult to prepare thermosetting resins in powder form because, when the powder is dried, some of the thermosetting action occurs, advancing the resinification of the materials and reducing the capacity of the powder particles to fuse and flow. Moreover, and even when the resin is placed in powder form, the elevated temperature required to fuse the resin particles also provokes the thermosetting action, and if the cure is a vigorous one, the thermosetting action proceeds before fusion is complete. This hampers film formation in powder coating, and it reduces the capacity of a material being molded to flow and fill the mold.

In this invention, the thermoplastic powder containing active hydrogen poorly reactive with itself is mulled with a liquid alkoxy monoisocyanate in stoichiometric deficiency so that the active hydrogen atoms at the surface of the powder particles is consumed and alkoxy groups generated in their place. This provides powder particles having a thermoplastic core containing unreacted active hydrogen atoms, but essentially free of alkoxy groups, and a surface portion containing alkoxy groups which are only slowly reactive with one another, but essentially free of active hydrogen atoms. When the particles fuse with one another at elevated temperature, the core and the surface portions of the particles intermix, causing the alkoxy groups to mingle with the active hydrogen atoms at elevated temperature where they react rapidly to thermoset the system. In this way the thermosetting resin powders are easily and efficiently formed and they possess superior fusion and flow properties since the rapid thermosetting action is forced to wait until significant fusion has been completed.

The alkoxy monoisocyanates contemplated by this invention are illustrated by alkoxy alkyl monoisocyanates which are liquid at about room temperature, but normally solid materials are less desirably employed using organic solvent to liquify the isocyanate compound to permit the desired mulling operation to take place. These are preferably illustrated by methoxy methyl isocyanate which has the formula $CH_3$—O—$CH_2$—NCO which is a liquid boiling in the range of 80–90° C. More broadly, isocyanates having the formula R—O—R'—NCO are contemplated, these being formed by the reaction of monohalo ethers with sodium cyanate. The R and R' groups are alkyl groups which may contain from 1–4 carbon atoms, but which are preferably methyl. The production of methoxy methyl isocyanate and the reaction with sodium cyanate is illustrated as follows:

A suspension of 700 grams sodium cyanate in a solvent mixture of 500 cc. benzonitrile and 1000 cc. mesitylene is prepared. To this mixture 648 grams of chloromethylmethyl ether is added. This mixture is refluxed until all organic chlorine has been converted to inorganic chlorine (about 12 hours). The formed methoxy methyl isocyanate is fractionally distilled directly from the mixture. The yield is 585 grams methoxy methyl isocyanate or 84% of theory. Boiling point at 760 mm. 89–90° C.

The thermoplastic powder resin may be of diverse type so long as it includes active hydrogen atoms reactable at relatively low temperature with the isocyanate group. This class of hydrogen atoms is well known, but the hydroxy group is particularly contemplated since it is strongly reactive with the alkoxy group at elevated temperature. Similarly, amino hydrogen and even amido hydrogen are reactive with isocyanate at low temperature and are reactive with alkoxy at elevated temperature. Carboxyl groups are also useful as is the mercaptan group. However, the invention particularly prefers hydroxy groups and primary amido hydrogen atoms, either alone or in admixture with one another. Carboxyl groups are preferably also present in small amount (from 0.1–5%, preferably from 0.2–1.0% by weight) to provide a catalytic effect for the elevated temperature cure involving the residual hydroxy groups.

Other functional groups may also be present such as epoxy groups or tertiary amino groups to aid the final cure or to improve adhesion in coating use. However, epoxy groups reduce the stability of the thermosetting powder, an effect which should be kept in mind when such groups are present.

Addition copolymers of monoethylenic monomers are particularly contemplated, such as copolymers of vinyl chloride and vinyl acetate which have been hydrolyzed to provide the desired hydroxy content. The corresponding partially hydrolyzed ethylene-vinyl acetate copolymers are also quite useful. Similarly, acrylic copolymers with allyl alcohol, trimethylol propane monoallyl ether or 2-hydroxy ethyl methacrylate can be used or styrene-allyl alcohol copolymers which may be employed as such or containing 1% of copolymerized acrylic acid. Indeed, all of the thermoplastic resinous polyols may be handled in this invention, including polyethers, polyesters and epoxy esters. The ester group in the epoxy ester or in the polyester may be saturated or unsaturated and the polyester would normally include a small acid functionality in addition to the larger hydroxy functionality which is desired.

The thermoplastic resinous polyols which are preferably used in this invention will desirably include from 1–15% OH by weight, preferably from 3–10% OH by weight.

The preferred resins have an hydroxy value of at least 20, preferably at least 40.

The invention will be illustrated using a styrene-allyl alcohol copolymer containing 6% OH by weight, since it is economically available, for example, from Monsanto under the trade designation RJ–100.

Copolymers containing acrylamide, and preferably also hydroxy groups, are also quite useful as illustrated by a copolymer of 50 parts methyl methacrylate, 35 parts ethyl acrylate, 9 parts hydroxy ethyl methacrylate, 5 parts acrylamide and 1 part methacrylic acid.

Higher melting thermoplastic materials increase the range of useful active hydrogen. Thus, nylons are used in powder coating and contain secondary amido hydrogen atoms. These will react with isocyanate at room temperature and then they will react with alkoxy at fusion temperature.

It should be noted that if the curing reaction is not complete when fusion is completed, then heat can be continued, or increased if desired.

Thus, in powder coating, one may fuse the powder at about 100–150° C. in a matter of seconds, but the coated piece may be further cured in an oven either as a continuation of the coating step or later.

The cure is quite advantageous in molding since, not only are the physical properties improved by having hardness combined with toughness, but the hardening occurs in the mold at elevated temperature so that the molded piece solidifies through cure as well as through cooling and it can acquire sufficient dimensional stability for ejection at higher temperature. This can speed the molding cycle and even eliminate the need for a cooling step.

While this invention preferably uses alkoxy alkyl monoisocyanates, it is also applicable to alkoxy aryl monoisocyanates, such as methoxy phenyl monoisocyanate, which is available with the methoxy group either ortho or para to the single isocyanate group. Since the position on the aromatic ring is of secondary significance, mixtures of the isomeric forms can be used. It should be recognized, however, that the alkoxy group is now more remote from the nitrogen atom, and it is less reactive requiring higher baking temperatures for ultimate cure.

It is also possible to substitute the epoxy group for the methoxy group. Here, a halogenated epoxide such as epichlorohydrin is reacted with sodium cyanate to produce the epoxy isocyanate, 1,2-epoxy-3-isocyanate:

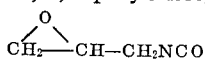

When a stoichiometric deficiency of epoxy isocyanate is mulled at about room temperature with the particles of hydroxy functional thermoplastic resin, then the hydroxy groups at the surface are replaced by epoxy groups, and these are not reactive with one another. However, on fusion, the hydroxy groups in the core mingle with the epoxy groups on the surface and these react vigorously to provide the desired cure, especially in the presence of alkaline catalyst, which may be applied with the epoxy isocyanate. The carboxyl group may be used instead of or in addition to the hydroxy group since it is more reactive with epoxy functionality.

While the principle of using the epoxy isocyanate is the same as when the methoxy isocyanate is used, the methoxy cure is preferred. However, one of the important limitations of the epoxy curing systems of the prior art is the instability of the epoxy group. Here, the physical separation of the hydroxy and epoxy groups and the solid phase of the system maximize storage stability. At the same time, the advantage of epoxy adhesion to the substrate is retained which is of considerable advantage in coating systems.

Another type of methoxy monoisocyanate which may be used in this invention is the monoisocyanate of trimethoxy silane having the formula:

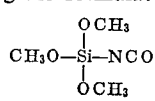

which can be produced by the reaction with the chlorine of trimethoxy chlorosilane in the same manner noted hereinbefore.

It is preferred in this invention to react the thermoplastic powder resin particles with a stoichiometric deficiency of the isocyanate in order to provide a structured powder particle containing a thermoplastic core surrounded by a surface portion containing the reactive groups introduced by reaction with the isocyanate. On the other hand, it is permissible to completely consume the active hydrogen atoms by reaction with the isocyanate and thereby produce a powder resin product in which the active hydrogen atoms originally present are entirely consumed. Here, the method aspects of the invention are still applicable and the powder product can then be mixed with additional powder constituted by thermoplastic resin containing active hydrogen atoms throughout the powder particle. Upon intimate admixture, adjacent powder particles will contain different functionalities, e.g., alkoxy functionality in one powder particle and hydroxy functionality in another powder particle. Upon fusion, the different functional groups intermix and the intermixture is accompanied by a vigorous thermosetting cure.

The mulling operation is preferably carried out at about room temperature, but some warming can be tolerated so long as reaction between the active hydrogen atoms of the thermoplastic resin and the alkoxy or epoxy groups carried by the monoisocyanate is substantially completely avoided. Thus, temperatures up to about 50° C. may be utilized, but are preferably avoided.

On the other hand, the reaction between active hydrogen and monoisocyanate will take place at about room temperature though the reaction is slow. If desired, a catalyst may be employed to speed the low temperature isocyanate reaction, dibutyl tin dilaurate being illustrative of known catalysts for this purpose. While the room temperature reaction is slow, this merely means that the mulling operation should be continued for an extended period of time such as several hours. If the reaction is not entirely completed within the muller, then containers containing the mulled powder can be agitated periodically to enable the last traces of reaction to take place while the powder is in storage.

The invention is illustrated as follows.

EXAMPLE 100 parts of a thermoplastic powder resin constituted by a copolymer of styrene and allyl alcohol containing 6% hydroxy by weight are mulled at room temperature (25° C.) with 4 parts by weight of methoxy methyl isocyanate. The mulling is continued for 6 hours to provide a powder resin product in which the liquid monoisocyanate is absorbed into the powder with the isocyanate functionality being largely consumed by reaction with the hydroxy groups of the styrene allyl alcohol copolymer. The product is stored as a dry powder at room temperature.

A layer of the powder of this example approximately 1 mil in thickness is spread upon a steel panel and the panel is placed in an oven and baked to fuse the powder to the panel. An oven temperature of 140° C. is used and the panel is maintained in the oven until fusion takes place. A smooth and continuous coating is formed which is characterized by significantly superior solvent resistance as compared to the original styrene-allyl alcohol copolymer.

In another test, the powder of this example is molded at 140° C. using a pressure of 50 p.s.i. The powder molds easily as though unmodified thermoplastic resin is used, but the molded piece is more solvent resistant and is sufficiently dimensionally stable for ejection at a higher temperature.

Referring to ancillary factors, the term "mulling" is an accepted term defining the simple continuous agitation of a powdery material, the powder being repeatedly lifted and dropped so that the powder particles are separated from one another to prevent excessive agglomeration of particles. The muller may be cooled, if desired, to maintain the desired temperature. The powder which is mulled should be dry since the moisture is independently reactive with the isocyanate group.

While sodium cyanate has been mentioned for the isocyanate-forming reaction, potassium, lithium and other metal cyanates are also useful, such as silver cyanate. Similarly, the sulfur atom can be substituted for the oxygen atom in the cyanate group.

From the standpoint of the monoisocyanate which is produced, this compound will contain a reactive functional group such as methoxy or epoxy, but no active hydrogen atom. Otherwise, there would be premature reaction with the isocyanate. Elements such as sulfur or phosphorous may be present in the monoisocyanate to improve ultraviolet and heat stability. So long as the monoisocyanate compound is free of active hydrogen reactive with isocyanate, it can be used in this invention.

The invention is defined in the claims which follow.

I claim:

1. A fusible thermosetting powder resin in which the individual powder particles have a core of thermoplastic resin containing unreacted active hydrogen atoms surrounded by a surface portion of the same resin modified to consume the active hydrogen atoms thereof and generate alkoxy functionality so that the said thermoplastic core is surrounded by a surface portion which is only slowly reactive at fusion temperature, the intermixture of active hydrogen atom and alkoxy functionality caused by fusion of the powder producing a more rapid thermosetting reaction when the powder is fused.

2. A powder resin as recited in claim 1 in which said active hydrogen atoms are provided by hydroxy groups.

3. A powder resin as recited in claim 2 in which the alkoxy functionality is provided by methoxy groups.

4. A power resin as recited in claim 1 in which the resin of said powder is a resinous polyol having an hydroxy value of at least 20.

5. A powder resin as recited in claim 1 in which said alkoxy functionality is generated by reaction of said thermoplastic resin with a methoxy monoisocyanate.

6. A powder resin as recited in claim 5 in which the isocyanate is methoxy methyl isocyanate.

7. A method for the production of a fusible thermosetting powder resin comprising mulling powder particles of thermoplastic resin containing active hydrogen atoms with a monoisocyanate containing alkoxy or epoxy groups to cause the isocyanate groups to react with the active hydrogen atoms of the thermoplastic resin to consume said active hydrogen atoms and replace the same with alkoxy or epoxy groups, said mulling being at a temperature below which said active hydrogen atoms will react with said alkoxy or epoxy groups.

8. A method as recited in claim 7 in which said thermoplastic resin is a resinous polyol containing from 1–15% hydroxy by weight.

9. A method as recited in claim 7 in which said monoisocyanate is a methoxy monoisocyanate 10. A method as recited in claim 7 in which said mulling operation is carried out at about room temperature.

11. A method as recited in claim 7 in which said monoisocyanate has the formula:

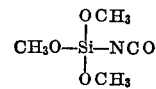

12. A method as recited in claim 7 in which the monoisocyanate is used in stoichiometric deficiency to produce a powder product having surface portions containing alkoxy or epoxy groups surrounding cores containing unreacted active hydrogen atoms.

13. A fusible thermosetting powder resin composition comprising powder particles produced as described in claim 7.

References Cited

UNITED STATES PATENTS

| | | | |
|---|---|---|---|
| 3,453,243 | 7/1969 | Hartlein | 260—77.5 AT |
| 3,409,461 | 11/1968 | Mehlo et al. | 260—77.5 AT |

DONALD E. CZAJA, Primary Examiner

M. J. WELSH, Assistant Examiner

U.S. Cl. X.R.

260—77.5 AA